(12) United States Patent
Lisi et al.

(10) Patent No.: US 10,033,440 B2
(45) Date of Patent: *Jul. 24, 2018

(54) INDUCTIVE STRUCTURES WITH REDUCED EMISSIONS AND INTERFERENCE

(71) Applicant: TEXAS INSTRUMENTS INCORPORATED, Dallas, TX (US)

(72) Inventors: Gianpaolo Lisi, Los Gatos, CA (US); Gerard Socci, Palo Alto, CA (US); Ali Djabbari, Saratoga, CA (US); Rajaram Subramonian, Cupertino, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/149,996

(22) Filed: May 9, 2016

(65) Prior Publication Data

US 2016/0254846 A1 Sep. 1, 2016

Related U.S. Application Data

(63) Continuation of application No. 14/026,515, filed on Sep. 13, 2013, now Pat. No. 9,337,905.

(60) Provisional application No. 61/876,796, filed on Sep. 12, 2013, provisional application No. 61/841,765, filed on Jul. 1, 2013.

(51) Int. Cl.
*H04B 5/00* (2006.01)

(52) U.S. Cl.
CPC ......... *H04B 5/0087* (2013.01); *H04B 5/0031* (2013.01); *H04B 5/0037* (2013.01)

(58) Field of Classification Search
CPC .................................................. H04B 5/0087

USPC ........................................................... 455/41
See application file for complete search history.

(56) References Cited

U.S. PATENT DOCUMENTS

| | | | |
|---|---|---|---|
| 7,545,059 B2 | 6/2009 | Chen et al. |
| 7,577,223 B2 | 8/2009 | Alfano et al. |
| 7,962,444 B2 | 6/2011 | Maciocci |
| 8,385,043 B2 | 2/2013 | Ng et al. |
| 8,527,688 B2 | 9/2013 | Chatterjee et al. |
| 9,337,905 B2 | 5/2016 | Lisi et al. |
| 2002/0177409 A1 | 11/2002 | Raggam |
| 2007/0018816 A1 | 1/2007 | Matsui et al. |
| 2008/0315925 A1 | 12/2008 | Alfano et al. |
| 2009/0096525 A1 | 4/2009 | Staszewski et al. |
| 2009/0207538 A1 | 8/2009 | Crawley et al. |
| 2009/0227205 A1 | 9/2009 | Rofougaran |
| 2010/0264515 A1 | 10/2010 | Nakashiba |
| 2013/0241302 A1 | 9/2013 | Miyamoto et al. |

(Continued)

OTHER PUBLICATIONS

Bieler et al., Thierry, "Contactless Power and Information Transmission," IEEE Transactions on Industry Applications, Sep./Oct. 2002, vol. 38, No. 5, pp. 1266-1272, Chicago, IL.

*Primary Examiner* — Wen Huang
(74) *Attorney, Agent, or Firm* — Michael A. Davis, Jr.; Charles A. Brill; Frank D. Cimino

(57) ABSTRACT

In described examples, an inductive structure includes a power coil and a data coil. The data coil is substantially centered within the power coil. A first portion of the data coil is for conducting current in a first direction. A second portion of the data coil is for conducting current in a second direction opposite the first direction. The first portion of the data coil is connected at a ground node to the second portion of the data coil. The power coil is for: receiving power without data; and outputting the received power without data.

50 Claims, 3 Drawing Sheets

(56) References Cited

U.S. PATENT DOCUMENTS

2014/0077919 A1    3/2014   Godoy et al.
2014/0168019 A1    6/2014   Hirobe et al.

INDUCTIVE STRUCTURES WITH REDUCED EMISSIONS AND INTERFERENCE

CROSS-REFERENCE TO RELATED APPLICATIONS

This application is a continuation of U.S. application Ser. No. 14/026,515 filed Sep. 13, 2013, which claims priority to: (a) U.S. Provisional Patent Application Ser. No. 61/841,765, filed Jul. 1, 2013, entitled A METHOD TO IMPROVE COMMON MODE TRANSIENT IMMUNITY FOR INDUCTIVE STRUCTURES, naming Rajaram Subramonian et al. as inventors; and (b) U.S. Provisional Patent Application Ser. No. 61/876,796, filed Sep. 12, 2013, entitled A METHOD TO IMPROVE COMMON MODE TRANSIENT IMMUNITY FOR INDUCTIVE STRUCTURES, naming Rajaram Subramonian et al. as inventors. All of the above-identified applications are hereby fully incorporated herein by reference for all purposes.

This application is related to co-owned co-pending U.S. patent application Ser. No. 14/311,354, filed on Jun. 23, 2014, issued as U.S. Pat. No. 9,450,651, entitled INDUCTIVE STRUCTURES WITH IMPROVED COMMON MODE TRANSIENT IMMUNITY, naming Rajaram Subramonian et al. as inventors.

This application is related to co-owned co-pending U.S. patent application Ser. No. 15/270,962, filed on Sep. 20, 2016, entitled INDUCTIVE STRUCTURES WITH IMPROVED COMMON MODE TRANSIENT IMMUNITY, naming Rajaram Subramonian et al. as inventors.

BACKGROUND

The disclosures herein relate in general to electronic structures, and in particular to inductive structures with reduced emissions and interference.

An inductively coupled structure (or "inductive structure") is useful for transmitting power and/or data from one or more transmitters to one or more receivers across an isolation barrier. If such power and data are transmitted through a single channel of an inductive structure, then various challenges and limitations may arise. However, if such power and data are transmitted through multiple channels of an inductive structure, then other challenges and limitations may arise (e.g., increased size, cost, emissions and/or interference).

SUMMARY

In described examples, an inductive structure includes a power coil and a data coil. The data coil is substantially centered within the power coil. A first portion of the data coil is for conducting current in a first direction. A second portion of the data coil is for conducting current in a second direction opposite the first direction. The first portion of the data coil is connected at a ground node to the second portion of the data coil. The power coil is for: receiving power without data; and outputting the received power without data.

DETAILED DESCRIPTION

Figure 1:
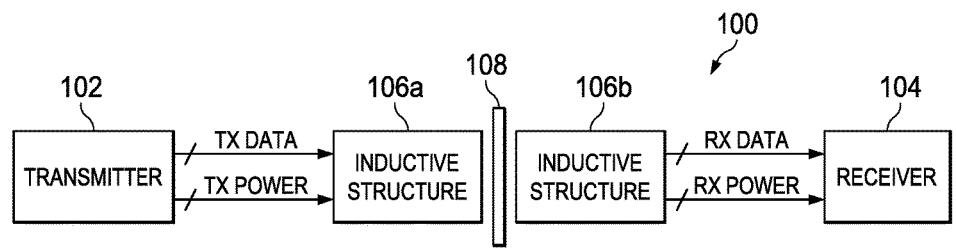
FIG. 1 is a block diagram of a system of the illustrative embodiments.

FIG. 1 is a block diagram of a system, indicated generally at 100, of the illustrative embodiments. A transmitter 102 outputs data and power to a receiver 104 through a device that includes inductive structures 106a and 106b (collectively, "inductive structure 106"). The inductive structure 106a: (a) receives the data from the transmitter 102 through differential TX Data lines; (b) receives the power from the transmitter 102 through differential TX Power lines; and (c) outputs the data and power by inductive coupling across an isolation barrier 108 to the inductive structure 106b. The inductive structure 106b: (a) receives the data and power by inductive coupling across the isolation barrier 108 from the inductive structure 106a; (b) outputs the data to the receiver 104 (which receives the data) through differential RX Data lines; and (c) outputs the power to the receiver 104 (which receives the power) through differential RX Power lines.

Figure 2:
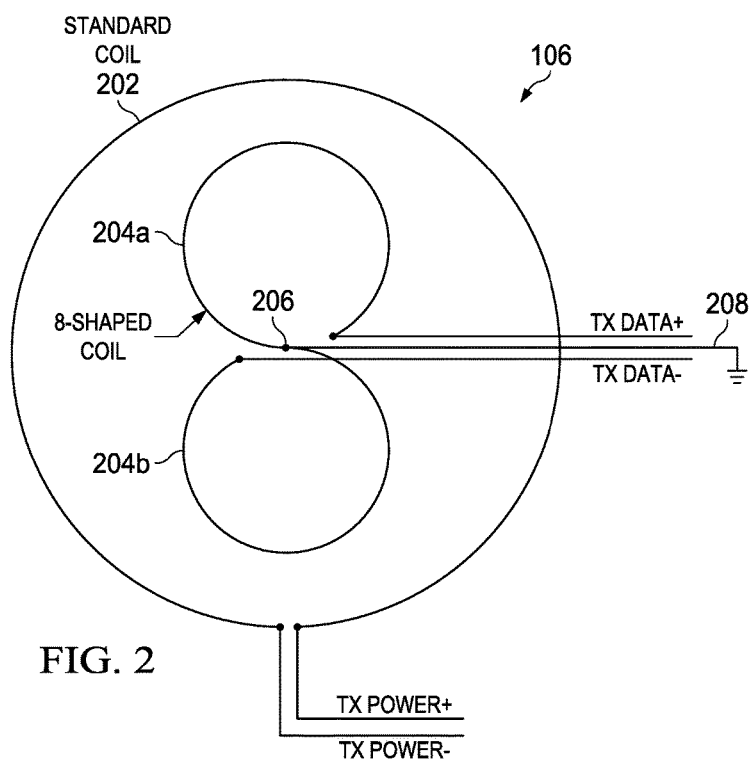
FIG. 2 is a schematic plan view of an inductive structure of FIG. 1.

FIG. 2 is a schematic plan view of the inductive structure 106. As shown in FIG. 2, the inductive structure 106a includes: (a) a standard power coil 202 connected to the differential TX Power lines, namely TX Power+ and TX Power−; and (b) data coils 204a and 204b (collectively, "data coil 204") connected to the differential TX Data lines, namely TX Data+ (connected to the data coil 204a) and TX Data− (connected to the data coil 204b). Also, the data coil 204a is connected to the data coil 204b at a node 206, which is coupled through a center tap ground line 208 to a first ground.

The data coil 204 is substantially centered within the power coil 202. Accordingly, the data coil 204 is smaller than the power coil 202. Because the data coil 204 is located (e.g., formed) within the center of the power coil 202, the inductive structure 106 has reduced size and cost.

Also, the data coil 204 is formed to have a relatively symmetric shape (e.g., symmetric 8-shape). As shown in FIG. 2, the data coil 204b is substantially identical to (yet reversed from) the data coil 204a. If current flows through the data coil 204a in one direction (e.g., clockwise), then current flows through the data coil 204b in an opposite direction (e.g., counterclockwise). Moreover, the center tap ground line 208 helps to substantially equalize a voltage between TX Data+ and the ground line 208 ("TX Data+ voltage"), relative to a voltage between TX Data− and the ground line 208 ("TX Data+ voltage").

In this example, an alternating current flows through the power coil 202. A magnetic field induced by the power coil 202 on the data coil 204a results in an electromotive force that is substantially equal in magnitude to (yet opposite in polarity from) an electromotive force induced by the power coil 202 on the data coil 204b, so an effect of magnetic flux from the power coil 202 on the data coil 204a is substantially counterbalanced (e.g., cancelled) by an effect of magnetic flux from the power coil 202 on the data coil 204b. Accordingly, the power coil 202 induces a relatively small difference (if any) between TX Data+ voltage and TX Data− voltage, even if the data coils 204a and 204b might have slight differences (e.g., in size and/or shape) from one another.

Further, an alternating current flows through the data coil 204. A magnetic field induced by the data coil 204a on the power coil 202 is substantially equal in magnitude to (yet opposite in polarity from) a magnetic field induced by the data coil 204b on the power coil 202, so an effect of magnetic flux from the data coil 204a on the power coil 202 is substantially counterbalanced (e.g., cancelled) by an effect of magnetic flux from the data coil 204b on the power coil 202. Accordingly, the data coil 204 induces a relatively small difference (if any) between TX Power+ voltage and TX Power– voltage, even if the data coils 204a and 204b might have slight differences (e.g., in size and/or shape) from one another.

In that manner: (a) the data coil 204 has reduced overall exposure to potential fields generated by the power coil 202, and vice versa; (b) cross-coupling between the power coil 202 and the data coil 204 is relatively small; and (c) the relatively symmetric shape (e.g., symmetric 8-shape) of the data coil 204 reduces interference between the data coil 204 and the power coil 202 (e.g., helps to preserve integrity of the data).

Figure 3:
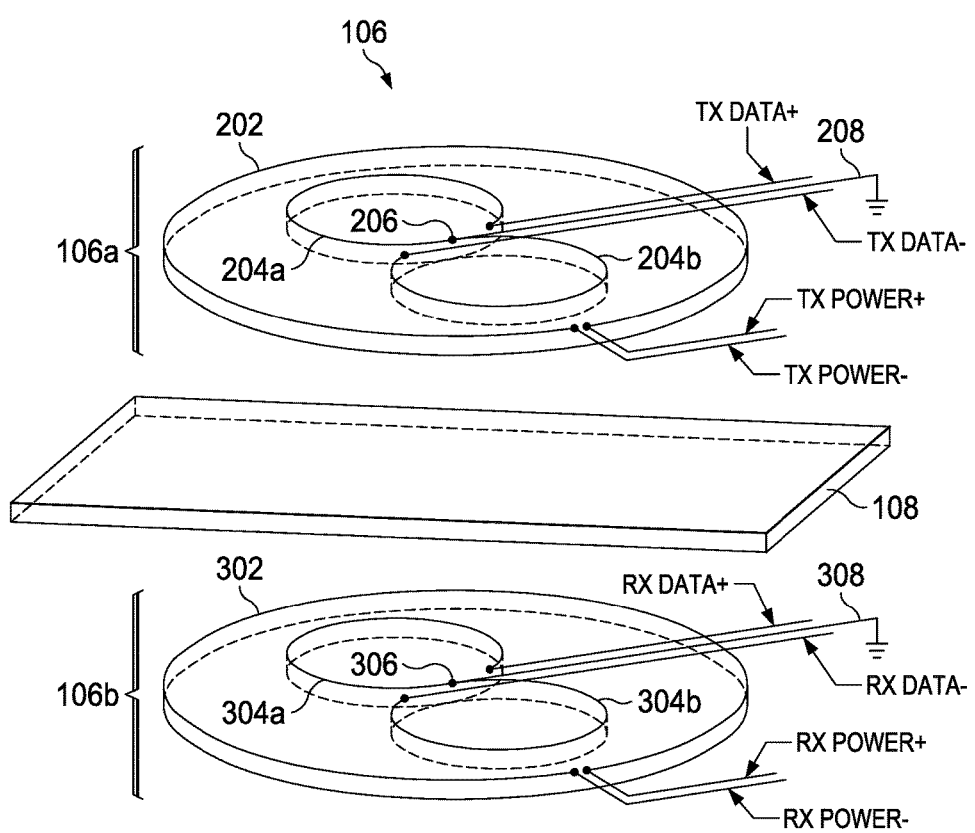
FIG. 3 is a schematic perspective view of the inductive structure of FIG. 1.
Figure 4:
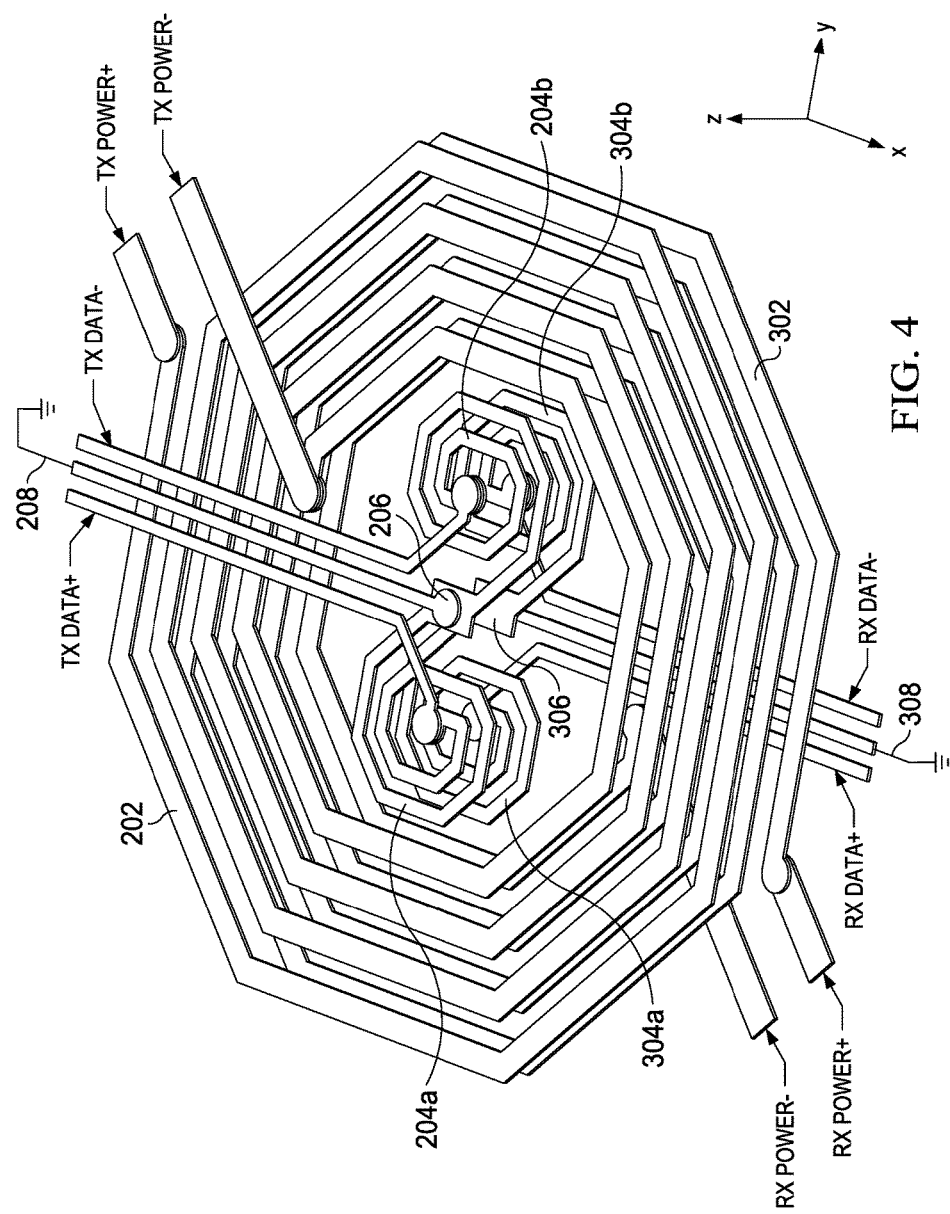
FIG. 4 is a structural perspective view of the inductive structure of FIG. 1.

FIG. 3 is a schematic perspective view of the inductive structure 106. FIG. 4 is a structural perspective view of the inductive structure 106. FIGS. 3 and 4 are not necessarily drawn to scale. As shown in FIGS. 3 and 4, the inductive structure 106b is substantially identical to the inductive structure 106a. Further, as shown in the example of FIG. 4, the power coils 202 and 302 have multiple turns, and the data coils 204 and 304 have multiple turns.

Accordingly, the inductive structure 106b includes: (a) a standard power coil 302 connected to the differential RX Power lines, namely RX Power+ and RX Power–; and (b) data coils 304a and 304b (collectively, "data coil 304") connected to the differential RX Data lines, namely RX Data+ (connected to the data coil 304a) and RX Data– (connected to the data coil 304b). Also, the data coil 304a is connected to the data coil 304b at a node 306, which is coupled through a center tap ground line 308 to a second ground that is isolated from the first ground (e.g., isolated from the center tap ground line 208).

The data coil 304 is substantially centered within the power coil 302. Accordingly, the data coil 304 is smaller than the power coil 302. Because the data coil 304 is located (e.g., formed) within the center of the power coil 302, the inductive structure 106 has reduced size and cost.

Also, the data coil 304 is formed to have a relatively symmetric shape (e.g., symmetric 8-shape). As shown in FIGS. 3 and 4, the data coil 304b is substantially identical to (yet reversed from) the data coil 304a. If current flows through the data coil 304a in one direction (e.g., clockwise), then current flows through the data coil 304b in an opposite direction (e.g., counterclockwise). Moreover, the center tap ground line 308 helps to substantially equalize a voltage between RX Data+ and the ground line 308 ("RX Data+ voltage"), relative to a voltage between RX Data– and the ground line 308 ("RX Data+ voltage").

Further, as shown in FIGS. 3 and 4, the inductive structures 106a and 106b are aligned with one another (e.g., the data coils 204a and 304a are aligned with one another, and the data coils 204b and 304b are aligned with one another), so that: (a) the power coils 202 and 302 have relatively good coupling with one another; (b) the data coils 204 and 304 have relatively good coupling with one another; (c) cross-coupling between the power coil 202 and the data coil 304 is relatively small; (d) cross-coupling between the power coil 302 and the data coil 204 is relatively small; and (e) radiated emissions are relatively small (e.g., as radiated by the data coils 204 and 304), which helps with electromagnetic interference ("EMI") certification.

Although illustrative embodiments have been shown and described by way of example, a wide range of alternative embodiments is possible within the scope of the foregoing disclosure.

The invention claimed is:

1. A device, comprising:
an inductive structure including a power coil and a data coil, wherein: the data coil is substantially centered within the power coil; a first portion of the data coil is structured to conduct current in a first direction; a second portion of the data coil is structured to conduct current in a second direction opposite the first direction; and the first portion of the data coil is connected at a ground node to the second portion of the data coil;
the power coil being structured to: receive power without data; and output the received power without data by inductive coupling.

2. The device of claim 1, wherein the power coil is structured to receive power without data from a transmitter.

3. The device of claim 1, wherein the power coil is structured to output the received power without data by inductive coupling across an isolation barrier.

4. The device of claim 1, wherein the power coil is a first power coil, and the first power coil is structured to output the received power without data by inductive coupling to a second power coil.

5. The device of claim 1, wherein the data coil is structured to: receive data; and output the received data by inductive coupling.

6. The device of claim 5, wherein the data coil is structured to receive data from a transmitter.

7. The device of claim 5, wherein the data coil is structured to output the received data by inductive coupling across an isolation barrier.

8. The device of claim 5, wherein the data coil is a first data coil, and the first data coil is structured to output the received data by inductive coupling to a second data coil that is isolated from the ground node.

9. The device of claim 1, wherein the first and second portions of the data coil are substantially identical to one another, yet reversed from one another.

10. The device of claim 1, wherein the data coil has a symmetric 8-shape substantially centered within the power coil.

11. A device, comprising:
an inductive structure including a power coil and a data coil, wherein: the data coil is substantially centered within the power coil; a first portion of the data coil is structured to conduct current in a first direction; a second portion of the data coil is structured to conduct current in a second direction opposite the first direction; and the first portion of the data coil is connected at a ground node to the second portion of the data coil;
the power coil being structured to: receive power without data by inductive coupling; and output the received power without data.

12. The device of claim 11, wherein the power coil is structured to receive power without data by inductive coupling across an isolation barrier.

13. The device of claim 11, wherein the power coil is a first power coil, and the first power coil is structured to receive power without data by inductive coupling from a second power coil.

14. The device of claim 11, wherein the power coil is structured to output the received power without data to a receiver.

15. The device of claim 11, wherein the data coil is structured to: receive data by inductive coupling; and output the received data.

16. The device of claim 15, wherein the data coil is structured to receive data by inductive coupling across an isolation barrier.

17. The device of claim 15, wherein the data coil is a first data coil, and the first data coil is structured to receive data by inductive coupling from a second data coil that is isolated from the ground node.

18. The device of claim 15, wherein the data coil is structured to output the received data to a receiver.

19. The device of claim 11, wherein the first and second portions of the data coil are substantially identical to one another, yet reversed from one another.

20. The device of claim 11, wherein the data coil has a symmetric 8-shape substantially centered within the power coil.

21. A device, comprising:
an inductive structure including a power coil and a data coil, wherein: the data coil is substantially centered within the power coil; a first portion of the data coil is structured to conduct current in a first direction; a second portion of the data coil is structured to conduct current in a second direction opposite the first direction; and the first portion of the data coil is connected at a ground node to the second portion of the data coil;
the power coil being structured to: receive power without data from a transmitter; and output the received power without data by inductive coupling across an isolation barrier; and
the data coil being structured to: receive data from the transmitter; and output the received data by inductive coupling across the isolation barrier.

22. The device of claim 21, wherein the power coil is a first power coil, and the first power coil is structured to output the received power without data by inductive coupling to a second power coil.

23. The device of claim 22, wherein the data coil is a first data coil, and the first data coil is structured to output the received data by inductive coupling to a second data coil that is isolated from the ground node.

24. The device of claim 21, wherein the first and second portions of the data coil are substantially identical to one another, yet reversed from one another.

25. The device of claim 21, wherein the data coil has a symmetric 8-shape substantially centered within the power coil.

26. A device, comprising:
an inductive structure including a power coil and a data coil, wherein: the data coil is substantially centered within the power coil; a first portion of the data coil is structured to conduct current in a first direction; a second portion of the data coil is structured to conduct current in a second direction opposite the first direction; and the first portion of the data coil is connected at a ground node to the second portion of the data coil;
the power coil being structured to: receive power without data by inductive coupling across an isolation barrier; and output the received power without data to a receiver; and
the data coil being structured to: receive data by inductive coupling across the isolation barrier; and output the received data to the receiver.

27. The device of claim 26, wherein the power coil is a first power coil, and the first power coil is structured to receive power without data by inductive coupling from a second power coil.

28. The device of claim 27, wherein the data coil is a first data coil, and the first data coil is structured to receive data by inductive coupling from a second data coil that is isolated from the ground node.

29. The device of claim 26, wherein the first and second portions of the data coil are substantially identical to one another, yet reversed from one another.

30. The device of claim 26, wherein the data coil has a symmetric 8-shape substantially centered within the power coil.

31. A method, comprising:
conducting current in a first direction through a first portion of a data coil of an inductive structure, wherein the inductive structure includes a power coil within which the data coil is substantially centered;
conducting current in a second direction through a second portion of the data coil, wherein: the second direction is opposite the first direction; and the first portion of the data coil is connected at a ground node to the second portion of the data coil; and
with the power coil, receiving power without data, and outputting the received power without data by inductive coupling.

32. The method of claim 31, wherein receiving power without data includes: receiving power without data from a transmitter.

33. The method of claim 31, wherein outputting the received power without data by inductive coupling includes: outputting the received power without data by inductive coupling across an isolation barrier.

34. The method of claim 31, wherein the power coil is a first power coil, and outputting the received power without data by inductive coupling includes: outputting the received power without data by inductive coupling to a second power coil.

35. The method of claim 31, and comprising:
with the data coil, receiving data, and outputting the received data by inductive coupling.

36. The method of claim 35, wherein receiving data includes: receiving data from a transmitter.

37. The method of claim 35, wherein outputting the received data by inductive coupling includes: outputting the received data by inductive coupling across an isolation barrier.

38. The method of claim 35, wherein the data coil is a first data coil, and outputting the received data by inductive coupling includes: outputting the received data by inductive coupling to a second data coil that is isolated from the ground node.

39. The method of claim 31, wherein the first and second portions of the data coil are substantially identical to one another, yet reversed from one another.

40. The method of claim 31, wherein the data coil has a symmetric 8-shape substantially centered within the power coil.

41. A method, comprising:
conducting current in a first direction through a first portion of a data coil of an inductive structure, wherein the inductive structure includes a power coil within which the data coil is substantially centered;
conducting current in a second direction through a second portion of the data coil, wherein: the second direction is opposite the first direction; and the first portion of the data coil is connected at a ground node to the second portion of the data coil; and with the power coil, receiving power without data by inductive coupling, and outputting the received power without data.

42. The method of claim 41, wherein receiving power without data by inductive coupling includes: receiving power without data by inductive coupling across an isolation barrier.

43. The method of claim 41, wherein the power coil is a first power coil, and receiving power without data by inductive coupling includes: receiving power without data by inductive coupling from a second power coil.

44. The method of claim 41, wherein outputting the received power without data includes: outputting the received power without data to a receiver.

45. The method of claim 41, and comprising:

with the data coil, receiving data by inductive coupling, and outputting the received data.

46. The method of claim 45, wherein receiving data by inductive coupling includes: receiving data by inductive coupling across an isolation barrier.

47. The method of claim 45, wherein the data coil is a first data coil, and receiving data by inductive coupling includes: receiving data by inductive coupling from a second data coil that is isolated from the ground node.

48. The method of claim 45, wherein outputting the received data includes: outputting the received data to a receiver.

49. The method of claim 41, wherein the first and second portions of the data coil are substantially identical to one another, yet reversed from one another.

50. The method of claim 41, wherein the data coil has a symmetric 8-shape substantially centered within the power coil.

* * * * *